United States Patent [19]
Wakayama

[11] Patent Number: 5,831,858
[45] Date of Patent: Nov. 3, 1998

[54] DATA CONVERTING DEVICE CONNECTABLE TO EMBROIDERY DATA PROCESSING APPARATUS

[75] Inventor: Akihiro Wakayama, Nagoya, Japan

[73] Assignee: Brother Kogyo Kabushiki Kaisha, Aichi-ken, Japan

[21] Appl. No.: 746,113

[22] Filed: Nov. 6, 1996

[30] Foreign Application Priority Data

Nov. 6, 1995 [JP] Japan .................................... 7-287106
May 28, 1996 [JP] Japan .................................... 8-133263

[51] Int. Cl.$^6$ ....................................................... G06F 5/00
[52] U.S. Cl. ............................... 364/470.09; 112/470.04; 112/102.5
[58] Field of Search ............................. 364/470, 470.09; 112/102, 470.04, 102.5; 360/74

[56] References Cited

U.S. PATENT DOCUMENTS

| | | | |
|---|---|---|---|
| 4,984,103 | 1/1991 | Nigam | 360/74.1 |
| 5,319,566 | 6/1994 | Kongho et al. | 364/470 |
| 5,383,413 | 1/1995 | Hayashi | 112/102.5 |
| 5,402,015 | 3/1995 | Hammermann | 326/75 |
| 5,701,830 | 12/1997 | Muto | 112/102.5 |

FOREIGN PATENT DOCUMENTS

| | | |
|---|---|---|
| 5-49767 | 3/1993 | Japan . |
| 6-86881 | 3/1994 | Japan . |

*Primary Examiner*—Reba I. Elmore
*Assistant Examiner*—Shelly A. Chase
*Attorney, Agent, or Firm*—Kane, Dalsimer, Sullivan, Kurucz, Levy, Eisele and Richard, LLP

[57] ABSTRACT

Disclosed is a data converting device for an embroidery data processing device which is capable of reading/writing data with use of a removable memory card. The data converting device has a connector connectable to a receptacle of the memory card provided on the embroidery data processing device. The data converting device reads data stored in an optical disk and converts a data structure and stores the converted data in a memory provided therein such that the data structure in the memory is similar to the data structure in the memory card.

15 Claims, 14 Drawing Sheets

DATA CONVERTING DEVICE CONNECTABLE TO EMBROIDERY DATA PROCESSING APPARATUS

BACKGROUND OF THE INVENTION

The present invention relates to a data converting device which is connectable to an embroidery data processing apparatus, such as a sewing machine.

Conventionally, there has been known an electronically controlled sewing machine which is capable of forming patterns of various shapes, embroideries as well as practical stitching patterns such as a zigzag stitch, linear stitch and the like. In such a sewing machine, in order to perform stitching and displaying of various patterns, relatively a large amount of data should be stored therein. However, since the number of patterns is greatly increasing recently, and due to the limited capacity of a memory built in the sewing machine, it becomes difficult to store all the data in the built-in memory.

To deal with this problem, the assignee suggested an electronically controlled sewing machine provided with a card reading device which is capable of reading an external card-shaped recording medium, such as a ROM card, a flash memory card or the like, in Japan Utility Model Provisional Publication HEI 5-49767.

Further to the above, in order to generate embroidery data and/or stitching data to be stored in the-above-describ ed card-shaped recording medium, an embroidery data processing device is also suggested by the assignee in Japan Patent Provisional Publication HEI 6-86881. Such a data processing device is also provided with a card writer which is capable of writing data to the externally connected card-shaped recording medium, and the data created by the data processing device is stored in the card-shaped recording media.

Recently, the embroideries which are large in size are desired to be formed. The large embroideries require a large numbered of stitches and therefore the amount of stitch data is increased. Further to the desires in size, the embroidery patterns becomes more and more complicated these days. Accordingly, the amount of data is also excessively increased. In conventional sewing machine, it has been possible to store the embroidery data in one external card memory. Recently, however, some embroidery data has a greater size than the capacity of the normal card-shaped memory. In such a case, the data cannot be stored in the card-shaped memory. Furthermore, due to the increasing number of embroidery patterns, a plurality of the card-shaped memory become necessary to store all the data which may be used in the sewing machine. In such a case, however, when a user is to use one of the data stored in one of the plurality of card memories, it is troublesome to find the desired data among the plurality of data separately stored in the card-shaped memories.

Further, such a card-shaped memory is generally composed of a semiconductor memory, and such a semiconductor memory has the capacity as much as well-known floppy disks, but the price thereof is relatively expensive (from forty or fifty times to four or five thousand times) with respect to the floppy disks. However, in the conventional embroidery data creating device, the data is stored only in the removable semiconductor memory, and therefore, handling of the stitching data is not easy to carry out.

SUMMARY OF THE INVENTION

It is therefore an object of the invention to provide an improved data converting device which enables the handling of the stitching data easier.

For the above object, according to the invention, it is provided a data converting device for a data processing apparatus using a first external recording medium which stores data in accordance with a predetermined format, the data processing apparatus having a receptacle to which the first external recording medium is to be electrically connected, the data converting device comprising: a data transmitting unit which transmits data between the data converting device and a second recording medium which stores data in accordance with a second therefor format which is different from the predetermined format; a memory; a data storing controller which stores the data for stores from the second recording medium and stores at least a part of the data in the memory in accordance with the predetermined format; and a connector which can be electrically connected to the receptacle, the data stored in the memory being transmitted to the data processing apparatus.

Optionally, the memory stores data received through the connector from the data processing apparatus in accordance with the predetermined format, and wherein the data transmitting unit sends data stored in the memory to the second recording medium in accordance with the second format.

Further optionally, the memory includes a first memory and a second memory, the first memory stores a predetermined amount of data received from the second recording medium at a time in accordance with the second format, the second memory stores data in accordance with the predetermined format, and wherein the data storing controller reads the data stored in the first memory, and stores the read data in the second memory with changing order of the read data.

According to another aspect of the invention, there is provided a data converting device for an embroidery data processing apparatus using a first external recording medium which stores data in accordance with a first format, the data processing apparatus having a receptacle to which the first external recording medium is to be electrically connected, the data converting device comprising: a data receiving unit which receives data from a second recording medium which stores data in accordance with a second format which is different from the first format; a first memory which temporarily stores the data received by the data receiving unit in accordance with the another format; a second memory; a data storing controller which reads the data stored in the first memory and stores the data in the second memory such that the data is stored in the second memory in accordance with the second format; and a connector which can be electrically connected to the receptacle, the data stored in the second memory being transmitted to the data processing apparatus.

Optionally, the first format is one of an addressing format and a tracking format, and the second format is the other of the addressing format and the tracking format.

Further, the first external recording medium comprises a semiconductor memory which is formatted in accordance with the addressing format. Furthermore, the first external recording medium comprises a memory card.

Further, the second recording medium is an optical disk employing the tracking format.

Further optionally, the embroidery data processing apparatus comprises a device built in a sewing machine, and wherein the sewing machine is capable of stitching in accordance with the data stored in the second memory.

Still optionally, the data processing device is a device provided in a sewing machine, and wherein the sewing machine is capable of stitching in accordance with the data stored in the second memory.

According to another aspect of the invention, there is provided a sewing system, comprises: a sewing machine, the sewing machine having a receptacle to which a first external recording medium is connectable, the first external recording medium storing an embroidery data in accordance with a first format which is read by the sewing machine through the receptacle and used for forming an embroidery; a data reading device which is capable of reading a data stored in a second recording medium in accordance with a second format which is different from the first format; and a data converting device having a memory, the data converting device receiving data from the data reading device and storing at least a part of received data in accordance with the first format in the memory, the data converting device being provided with a connector which is connectable to the receptacle, the data stored in the memory in accordance with the first format being readable by the sewing machine through the connector coupled to the receptacle.

According to further aspect of the invention, there is provided a data converting system for an embroidery data processing apparatus, the embroidery data processing apparatus having a receptacle to which a first external recording medium is connectable, the first external recording medium storing data in accordance with a first format, the data converting device comprising: a second recording medium, which stores data in accordance with a second format which is different from the first format; a data reading system, which reads data from the second recording medium; a data receiving system, which receives the data read by the data reading system from the second recording medium; a data storing system, which stores the data received by the data receiving system in accordance with the first format; a connecting system, which electrically connects the data storing system with the receptacle.

Optionally, the data converting may include a data converting device in which the data reading system, the data receiving system, the data storing system and the connecting system are integrally provided.

Alternatively the data converting system may include a data reading device and a data converting device separate from the data reading device, the data reading device being provided with the data reading system, the data converting device being provided with the data receiving system, the data storing system, and the connecting system.

Optionally, the data reading system comprises a computer having a disk reading device.

DESCRIPTION OF THE ACCOMPANYING DRAWINGS

DESCRIPTION OF THE EMBODIMENT

Figure 1:
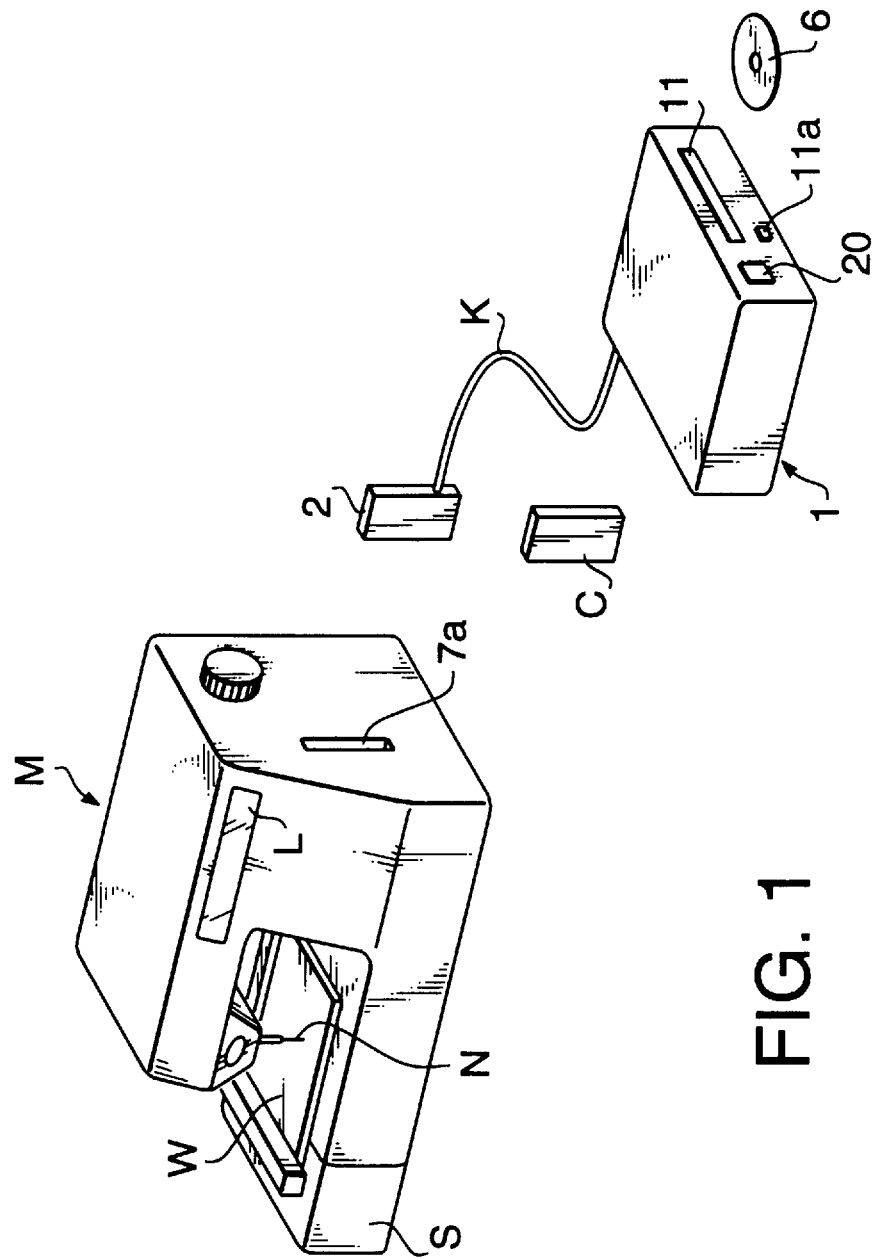
FIG. 1 shows a perspective view of a sewing machine to which a semiconductor memory is connectable, and a data read/write device embodying the present invention.
Figure 2:
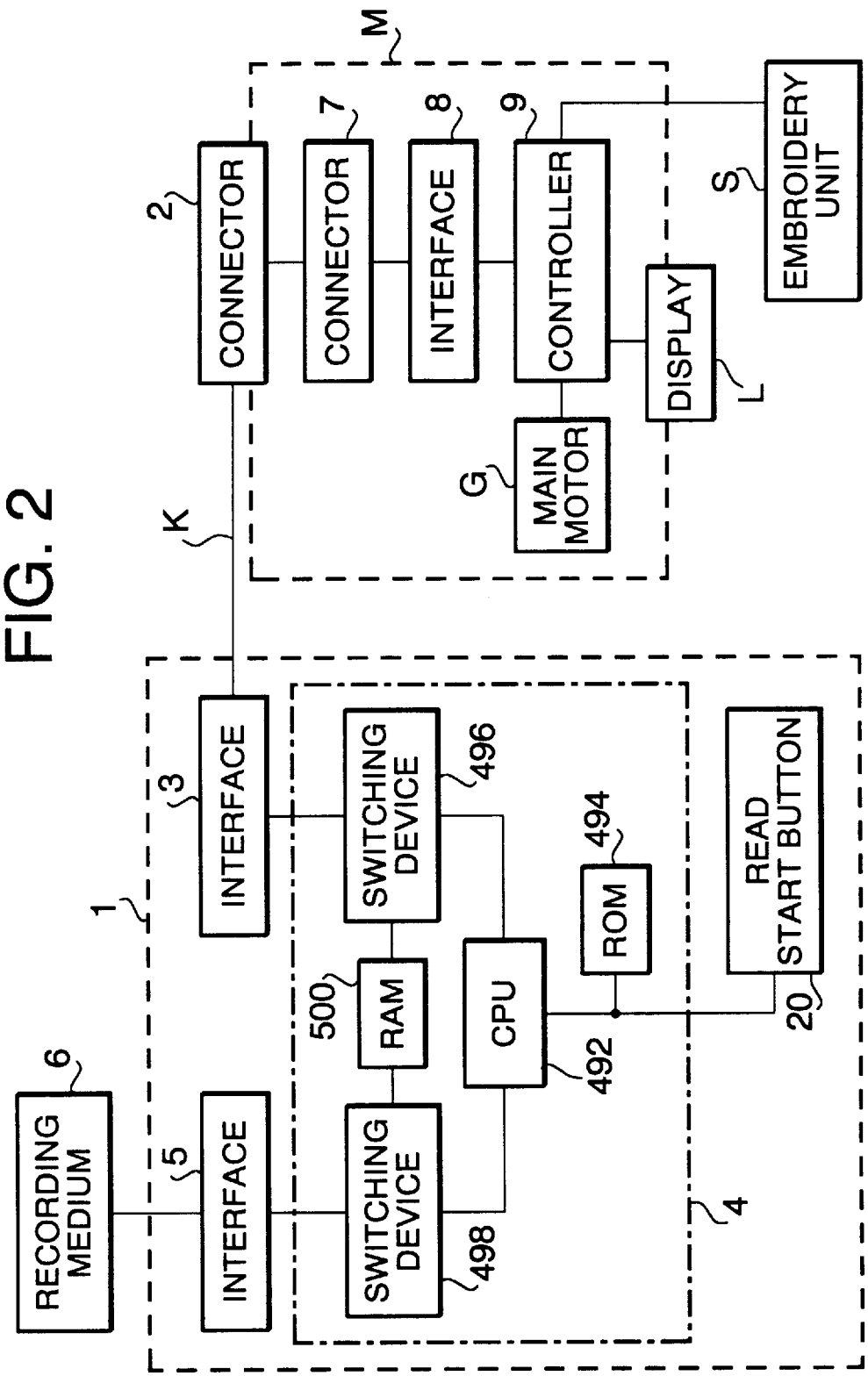
FIG. 2 is a block diagram of the sewing machine and the data read/write device shown in FIG. 1.

FIG. 1 shows a perspective view of a sewing machine M and a data converting device 1, and FIG. 2 is a block diagram of a control systems of the sewing machine M and the data converting device 1 shown in FIG. 1.

The sewing machine M has a shuttle, a stitching needle N and, as shown in FIG. 2, a main motor G for generating driving force to drive the shuttle, needle N and the like. Further, the sewing machine M has a card reading apparatus which is capable of reading card-shaped semiconductor memory such as a ROM card, flash memory card or the like, as an external memory. Hereinafter, the card-shaped semiconductor memory is referred to as a memory card C.

The sewing machine M processes the data stored in the memory card C. In the sewing machine M, an embroidery frame W which is supported by an embroidery unit S is moved relative to the stitching needle N. The embroidery frame W holds a cloth on which the embroidery is to be formed. As the stitching is executed, the embroidery frame W is moved in accordance with the embroidery data stored in the memory card C, and accordingly, the embroidery is formed on the cloth.

As shown in FIG. 1, on a side surface of the sewing machine M, an opening 7a of a connector 7 (see FIG. 2) is formed. The memory card C is to be inserted through the opening 7a, and connected to the connector 7. If the memory card c is connected to the connector 7 of the sewing machine M, which is shown in FIG. 2, the embroidery data is transmitted between the memory card C and the control unit 9 of the sewing machine M through the data converting device 1 and an input/output interface 8.

The control unit 9 controls an entire operation of the sewing machine M. The control unit 9 of the sewing machine M has a CPU (Central Processing Unit), ROM (Read Only Memory), RAM (Random Access Memory) and the like (not shown). Movement of the main motor G, a stepping motor (not shown) are controlled by the control unit 9. The control unit 9 further monitors the operating conditions of the switches such as start/stop switch and the like, signals output from sensors provided inside the sewing machine M, movement of the embroidery unit S, and the like. The control unit 9 drives the embroidery unit S in accordance with the embroidery data stored in the built-in memory or the memory card C. When the data stored in the optical disk 6 is used, the data is once developed in a memory of the data converting device, and then the sewing machine M uses the data memory of the data converting device, which will be described in detail later.

The memory card C stores data related to stitching operation of the sewing machine M. The capacity of the memory card C is as much as a floppy disk as described above, however, the price of the memory card C is much greater than the floppy disk.

Figure 9:
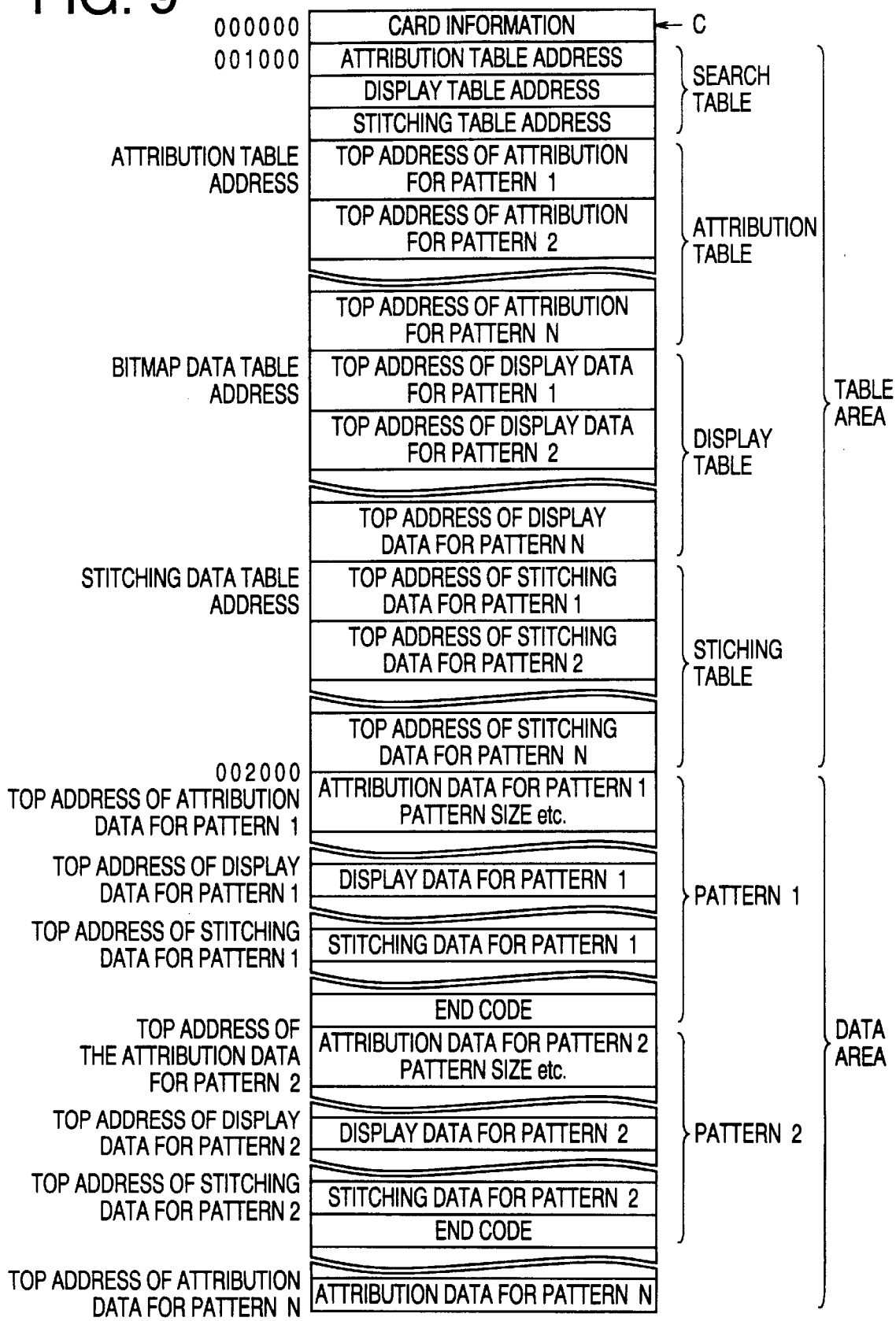
FIG. 9 shows data structure in a RAM of the data read/write device.

FIG. 9 is an exemplary memory map of the memory card C. As shown in FIG. 9, the memory card C stores data for a plurality of embroidery patterns, i.e., from 1st to N-the embroidery patterns. Each embroidery pattern data has a sewing data, i.e., an attribution data, display data, and stitching data.

The attribution data includes parameters indicating the size of the pattern, density of stitches or the like, and some of the parameters may be fixed values, some may be variable values. The display data includes a bit map data to be used for displaying the pattern on a displaying device L provided on the sewing machine M (see FIG. 1). If the sewing machine M is of a type which is capable of displaying the pattern image based on the stitching data, the bit map data can be omitted, which means that the memory card C does not necessarily store the bit map for display.

The stitching data is data indicating relative position between the needle N and the cloths (or, the embroidery frame S) for each stitch, and generally, data indicating moving amount in an X and Y directions in accordance with an X-Y coordinate system. Alternatively, the stitching data can be absolute values in the X-Y coordinate system. Further to the sewing data described above, character data, a part of control programs can also be stored in the memory card C. Further, the memory card C stores a card information which indicates a type of the memory card C.

The memory card C stores search tables which include:
- an attribution table which stores the top addresses of attribution data for respective patterns;
- a display table which stores the top addresses of the display data for respective patterns; and
- a stitching table which stores the top addresses of the stitching data for respective patterns.

The sewing data is stored at areas indicated by the respective addresses in such tables, i.e., in the search tables. Data storing format in the memory card C is an addressing format which is generally used for the semiconductor memory. However, the format is not limited to the above, and can be any type of format applicable to the semiconductor memory, and therefore the format will not be described.

Figure 10:
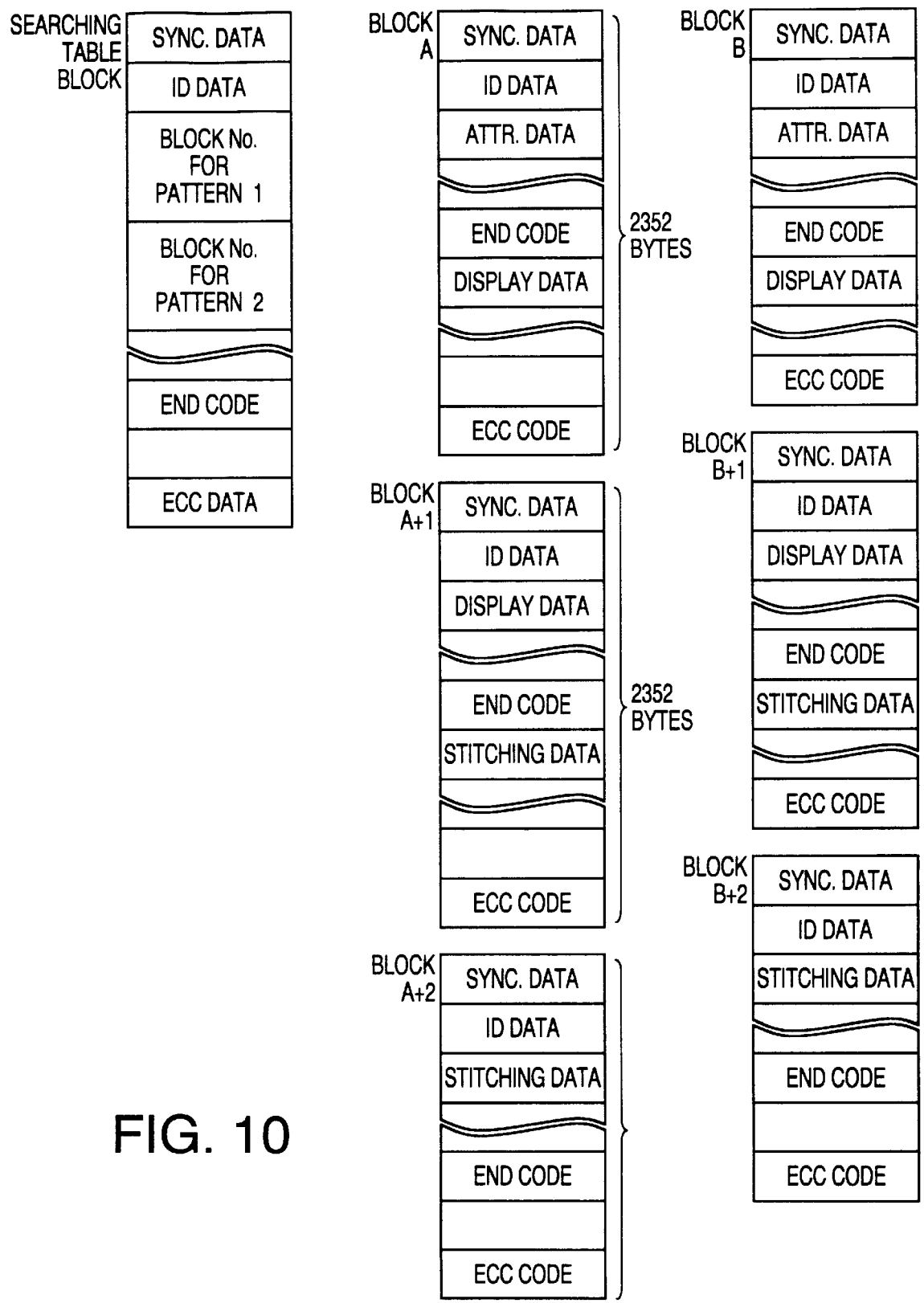
FIG. 10 shows a data storing format of an optical disk.

FIG. 10 shows a data recording format of an optical disk 6. The optical disk 6 has a different recording format as the memory card C. The optical disk 6 is also an external data storing medium. Although the recording format, which is known as a tracking format, is different from that of the card memory as described above, the capacity is much greater than the card memory: from hundreds of time to thousands of times greater than the memory card C, and much less expensive than the memory card C.

With use of laser beam or the like, data is stored/read at relatively high density on the optical disk 6. The optical disk 6 has a spirally-shaped data track on which concave spots are formed. Combination of the concave and non-concave portions indicate binary data. The format as described above is well known as a tracking format and will not be described in detail.

The spirally-shaped data track is divided into physical sectors, each sector having 2356 bytes of data. For example, as shown in FIG. 10, each sector has a data block consisting of;
- a synchronizing signal data (12 bytes);
- an ID data indicative of a predetermined operational mode (4 bytes);
- a user data area (2048 bytes); and
- an ECC data (288 bytes).

The ECC data is an error correction data to be used for checking the data error in each sector. The ID data is for music CD's (a period of music performances and the like), and is not necessary for the CD-ROM's.

The sewing data of the embroidery pattern is stored in the user data area. If the sewing data to be store is larger than the user data area, i.e., the sewing data is greater than 2048 bytes, the data can be divided into more than one pieces, and stored in more than one user data areas.

The spirally-shaped data track begins at the center of the optical disk 6, and ends at the outer side of the disk 6. The optical disk 6 is defined as a mode I recording medium which stores data related to computer operation.

The data converting device 1 will be described in detail. The data converting device 1 has, as shown in FIG. 2, an input/output interface 5 through which data is transmitted to/from the optical disk 6. Further, the data converting device 1 is provided with a controlling unit 4 connected to the input/output interface 5, another input/output interface 3 through which data is transmitted to/from the sewing machine M, and a connector 2 for connecting the interface 3 and the sewing machine M. The controlling unit 4 and the connector 2 are connected through the interface 3 and a cable K.

The controlling unit 4 has a CPU 492, a ROM 494, a RAM 500 and the like. In the ROM 494, a program for achieving the data structure of the memory card C (see FIG. 9) on the RAM 500 is stored. The interface 5 is a read/write device which has a read/write head and is capable of execute reading/writing operation of the optical disk 6. The controlling unit 4 is capable of converting data which is input through the interface 5 into data having the data format of the memory card C on the RAM 500 based on the program stored in the ROM 494, and transmitting the converted data to the sewing machine M through the interface 3 and the connector 2. The controlling unit 4 is also capable of converting data input through the interface 3 to the data format of the optical disk 6 and transmitting the same to the interface 5.

Accordingly, it becomes possible that the sewing machine M forms an embroidery based on data stored in the optical disk 6, since when the data stored in the optical disk 6 is transmitted to the sewing machine M through the data converting device 1, the data structure is the same as that of the memory card C. In other words, the sewing machine M carries out data transmission between the RAM 500 of the data converting machine as if the data transmission is done with respect to the memory card C. Namely, the optical disk 6 can be used as an external data storing medium of the sewing machine M as well as the memory card C.

In the sewing machine M described above, data can be processed, i.e., a new data can be created by a user. The new data which is, for example, created by combining a plurality of data, is output from the sewing machine in accordance with a format of the memory card C, i.e., the addressing format through the interface 8. If the memory card C is connected to the sewing machine M, the data is stored in the memory card C. According to the embodiment, the data converting device 1 can be connected with the sewing machine M. In such a case, the data created in the sewing machine is stored in the RAM 500, and then transmitted to the optical disk 6. Thus, the data output from the sewing machine M is written on the optical disk 6 through the data converting device 1. As described above, the data format of the optical disk 6 is different from the format of the memory card C, and therefore when the data is transmitted from the RAM 500 to the interface 5 to write the data on the optical disk 6, the format is to be changed.

Data transmission from the optical disk 6 to the data converting device 1 is initiated when the user depresses a reading start button 20 provided on the surface of the data converting device 1.

As shown in FIG. 1, the data converting device 1 has a slot 11 on the side surface thereof, through which the optical disk 6 is inserted into or removed from the data converting device 1. Adjacent to the slot 11, a button 11a for ejecting the optical disk 6 is provided. The reading g start button is also provided adjacent to the slot 11.

Figure 8:
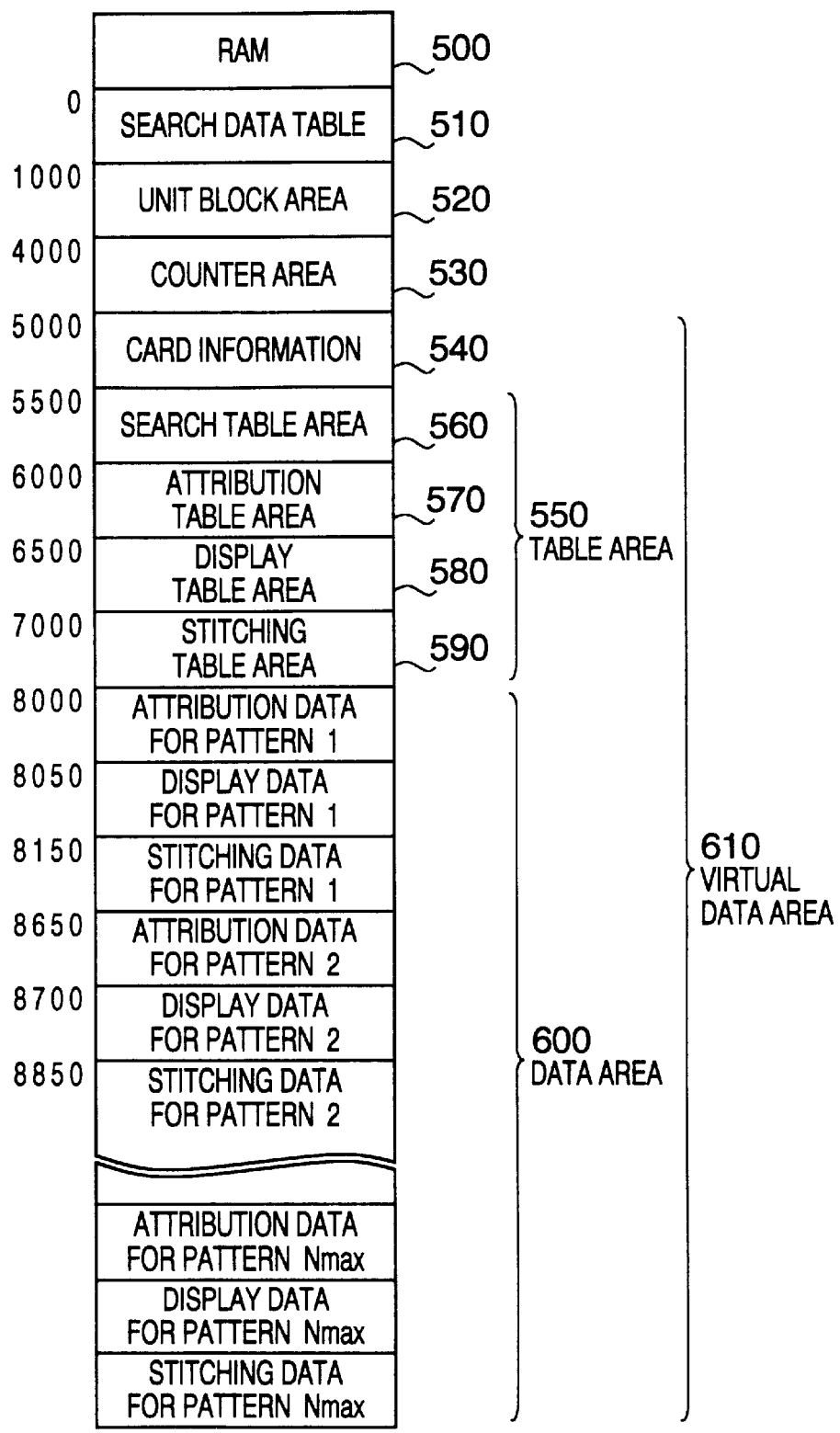
FIG. 8 is a memory map showing data storing areas of a RAM of the data read/write device.

FIG. 8 shows a memory map of RAM 500 which is used for storing data read out of the optical disk 6.

At the top of the address map shown in FIG. 8, a search table area 510 is provided from address 0 of the RAM 500. The search table area 510 is used for storing data corresponding to a search table stored in the optical disk 6. Following the search table area 510, a unit block area 520 is provided from address 1000. The unit block area 520 is an area for temporarily storing a block of data transmitted from the optical disk 6. Next to the unit block area 520, a counter area 530 is provided from address 4000. The counter area 530 is used when the sewing data is transmitted, which will be described in detail later. After the counter area 530, a card information area 540 starts at address 5000. The card information area 540 stores a card information of the optical disk 6. The card information enables the sewing machine to recognize the RAM 500 as a memory card, and includes a pass word data, a card number, to and the like.

Further, from address 5500, a table area 550 is provided. The table area 550 stores tables to be used for searching sewing data stored in a data area 600 of the RAM 500. A plurality of tables are stored in the table area 550; i.e., a search table 560, an attribution table 570, a display table 580 and a stitching table 590, respectively beginning at addresses 5500, 6000, 6500 and 7000.

The search table 560 is a table to be sued for searching addresses of the other tables. In each table, the top addresses of data of the embroidery patterns are stored at predetermined interval. That is, the subsequent top addresses are apart by a predetermined number of address. For each embroidery pattern, the attribution data, the display data and the stitching data are stored in the data area 600. The data area 600 starts at address 8000 in FIG. 8, and the data area 600 is capable of storing all the sewing data stored in the optical disk 6. In the data area 600, data is stored from the lower address side to the higher address side in order.

The data stored in the card information area 540, table area 550, data area 600, a data storage area having a similar structure to the structure of the memory card C shown in FIG. 9. The area having the similar structure as that of the memory card C will be referred to as a virtual card area 610. Since the RAM 500 has the above-described data structure, the sewing machine M treats the RAM 500 as if it is a memory card C.

Note that above-described addressing (data format) is an example, and various ways of addressing can be employed depending on the standard which the optical disk 6 follows, the capacity of the RAM 500, or the like. The number and the kinds of the tables may also be determined in accordance with the sewing data stored in the memory card C or the optical disk 6. In other words, any format is possible if the RAM 500 has the same data structure as a memory card to be used by the sewing machine M.

A process for developing data stored in the optical disk 6 on the RAM 500 such that the data structure on the RAM 500 is similar to the format of the memory card C will be described with reference to drawings 7 to 10.

Figure 3:
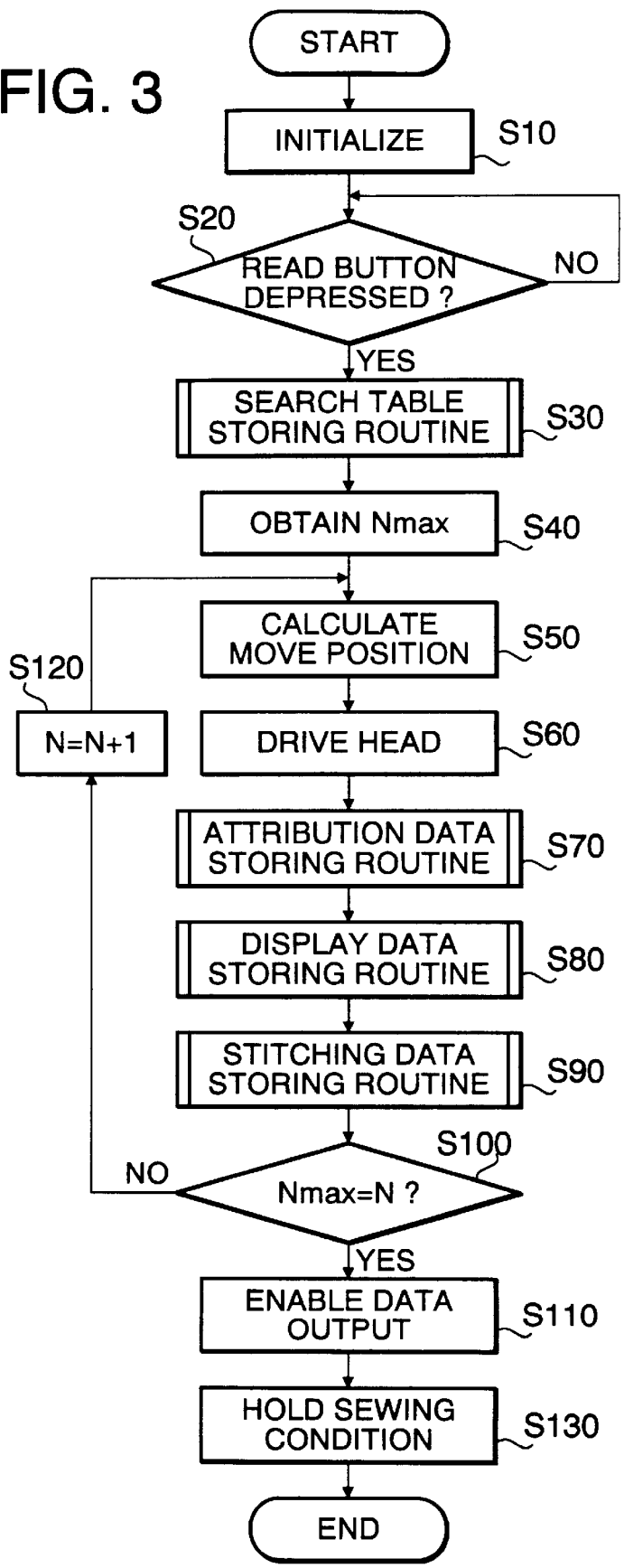
FIG. 3 is a flowchart illustrating a main routine executed in the data read/write device.

FIG. 3 shows a flowchart illustrating a main routine executed by the CPU 492. The flowchart starts when power is supplied to the data converting device 1.

At S10, the CPU 429 executes an initialization process, where the CPU 492 initializes counters to be used in the routine, and a predetermined card information data for identifying a type of a memory card achieved by formatting the RAM 500 is stored in the card information area 540, which enables the sewing machine M to use the data stored in the RAM 500 as if the RAM 500 is a memory card. Further, the CPU 492 sets the starting addresses of the tables (i.e., addresses 5000, 6000, 65000, 7000).

Specifically, during this process of initialization, the pattern number N, which indicates an embroidery pattern stored in the optical disk 6 and to be outputted, is set to 1, and an output block number NH, which identified a block of the optical disk 6 to be output is set to 1. Further, a counter CA which indicates the top address of the card information 540 is set to 5000. Similarly, counters KA, ZA, HA and UA which represent top addresses of the searching table 560, attribution table 570, display table 580 and stitching table 590 are set to 5500, 6000, 6500 and 7000, respectively.

A counter DA which represents the top address of the sewing data storing area 600 for storing each sewing data in the RAM 500 is set to 8000. The above values set during the initialization process are stored in the ROM 494, and read out by the CPU 492 when the initialization is executed.

When an operator inserts the optical disk 6 through the slot 11, and depresses an operation button 20 (S20:YES), the CPU 492 judges that the output of the sewing data is initiated. If determination at S20 is YES, the CPU 492 reads the search table stored at the top of the optical disk 6 and store the search table read from the optical disk 6 in the search table area 510 (S30) of the RAM 500. Then, the CPU 492 obtains the total number of the embroidery patterns stored in the optical disk 6 based on the data in the search table stored in the search table area 510 (S40). At S50, the CPU 492 sets the block number NH of the first pattern "PATTERN 1" in the optical disk 6, and then, at S60, the CPU 492 moves a reading head provided in the interface 5 to the position corresponding to the block identified by the block number NH, i.e., the block A of the optical disk (see FIG. 10).

Figure 4:
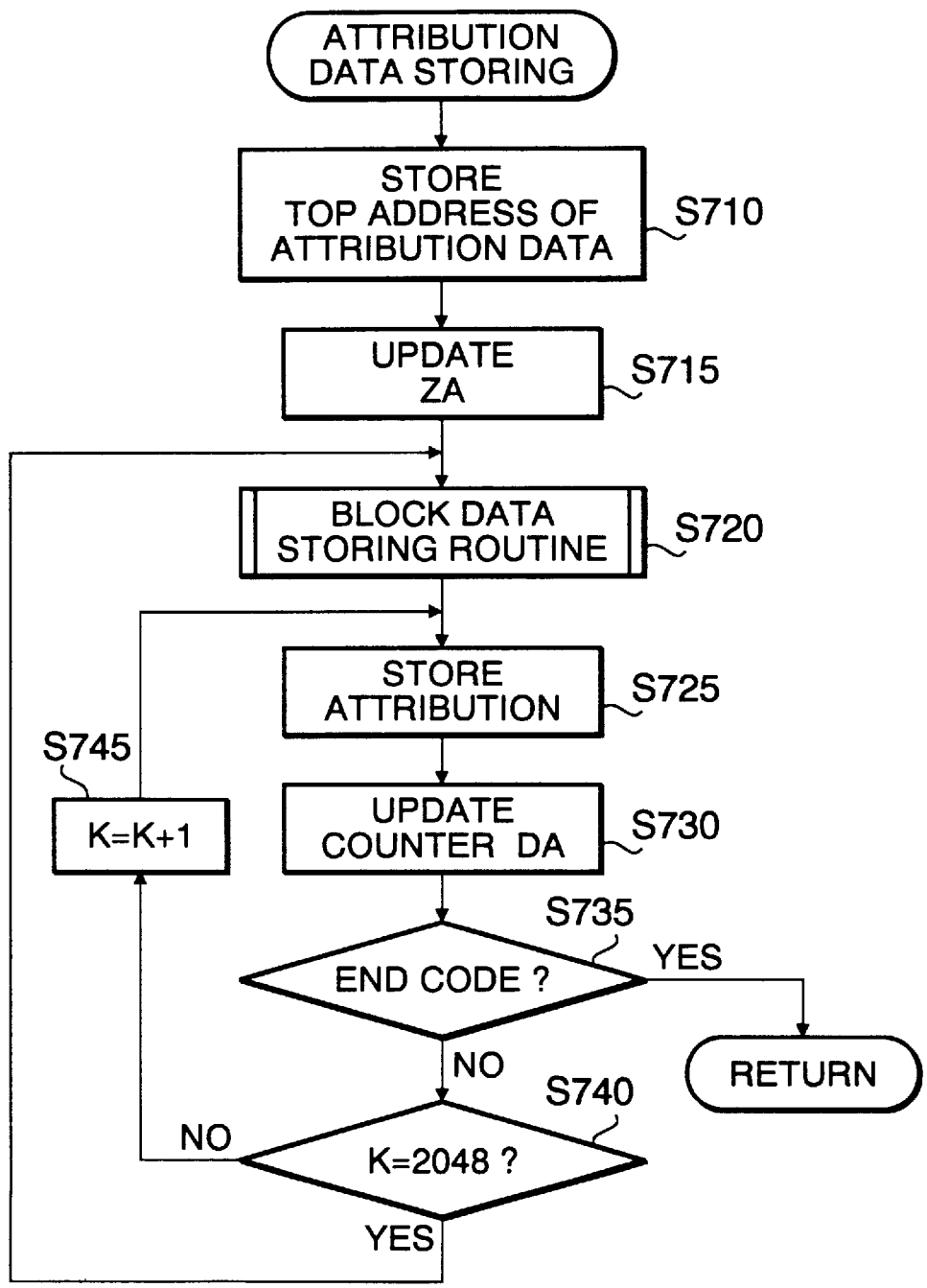
FIG. 4 is a flowchart illustrating attribution data storing routine.
Figure 5:
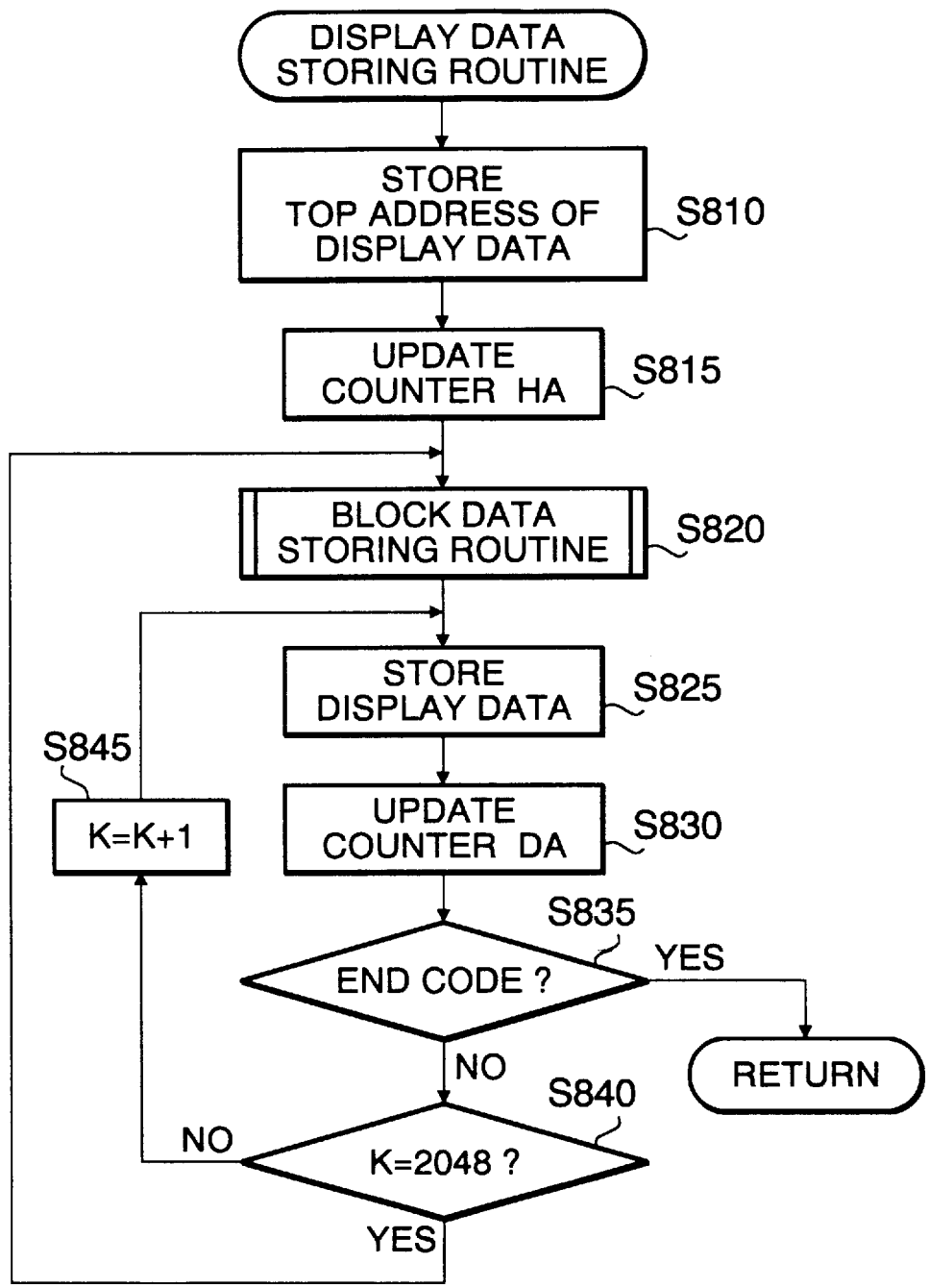
FIG. 5 is a flowchart illustrating display data storing routine.
Figure 6:
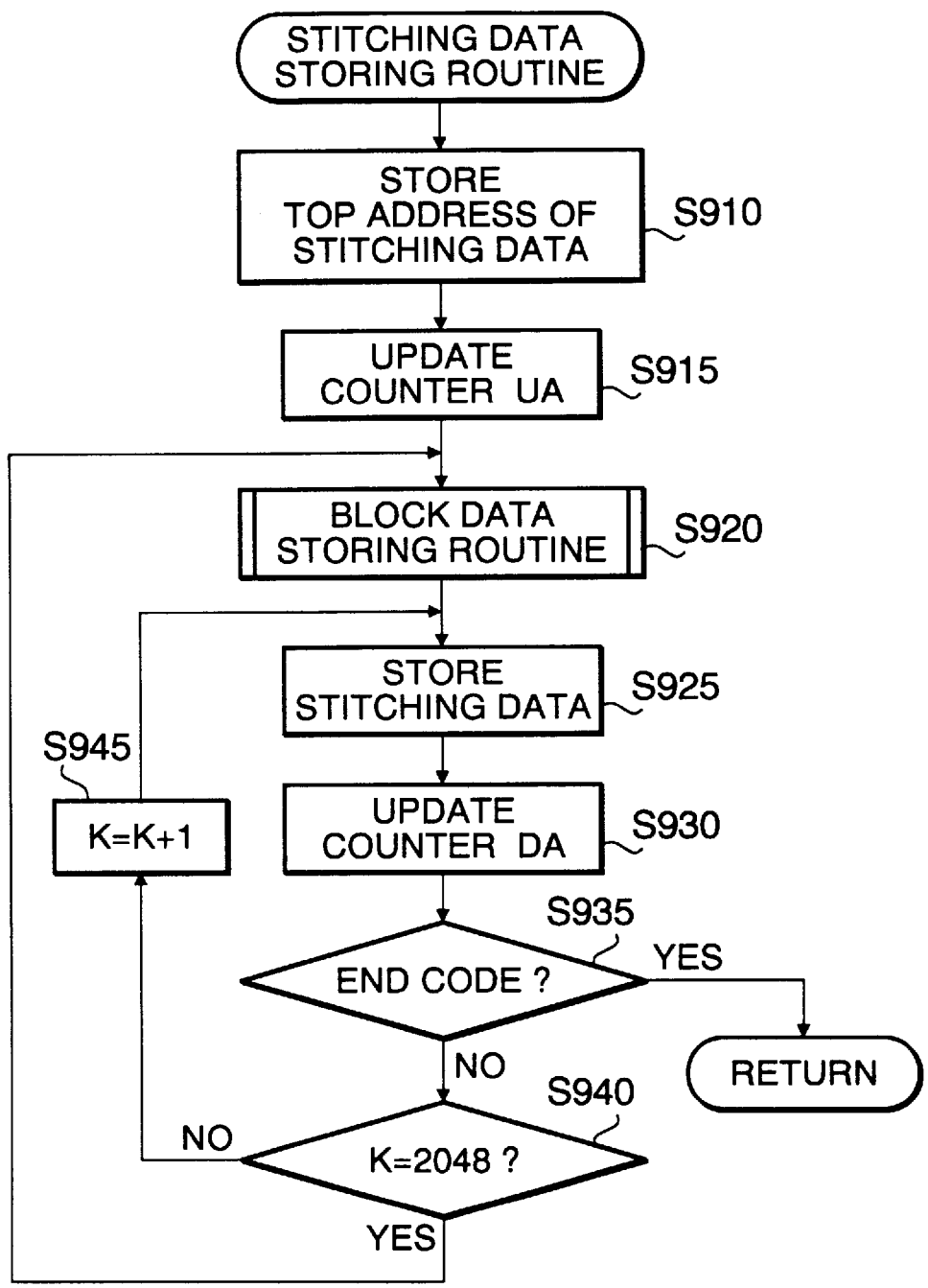
FIG. 6 is a flowchart illustrating stitch data storing routine.

Next, the CPU 492 calls an attribution storing routine at S70. The attribution storing routine is illustrated in a flowchart shown in FIG. 4.

At S710 of the attribution storing routine, the CPU 492 stores the address indicated by the counter DA (i.e., 8000) at address indicated by the counter ZA (i.e., 6000) of the attribution table area 570, which enables searching of the starting position of the attribution data of the PATTERN 1. Then, the CPU 492 updates the counter ZA to the value indicating the subsequent storing position in the attribution area 570, at which the address of the next pattern "PATTERN 2" will be stored. If, for example, the interval between subsequent addresses is 10, the counter ZA is updated from 6000 to 6010. In such a case, the first address indicating the top address of the first pattern is stored at the address 6000, and the next address indicating the top address of the second pattern is stored at the address 6010.

At S720, the CPU 492 executes a block data storing routine. In this routine, if data is stored in the unit block area, and the data in the unit block area 520 has not yet processed, the routine does nothing. However, if the data stored in the unit block area 520 has been processed, or no data is stored in the unit block area 520, the CPU 492 reads data corresponding to the block number NH from the optical disk 6, and stores the user data area of the block read from the optical disk 6, i.e., 2048 bytes of data, in the unit block area 520. The data storing routine executed at S720 will be described in detail with reference to a flowchart shown in FIG. 7 later.

Next, the CPU 492 reads one byte of attribution data from the unit block area 520, and store the same at an address that is indicated by the counter DA (i.e., 8000). Accordingly, the attribution table is stored at the address corresponding to the address stored in the attribution table area 570 (S725). Further, the CPU 492 updates the counter DA so that the counter DA indicates the address at which the subsequent attribution data is to be stored.

For example, if one address corresponds to one byte, i.e., the data area 600 is used by an amount corresponding to one address in order to store one byte of the attribution data of the pattern 1, the CPU 492 increments the counter DA by one (i.e., the counter DA is updated to 8001) at S730. That is, the attribution data of the pattern 1 is stored at the address 8000, and the subsequent attribution data (corresponding to a pattern 2) will be stored at the address 8001 since that updated counter DA has a value 8001.

As described above, the CPU 492 stores the attribution data in the data area 600 one byte after another until the end code is read from the unit block area 520, and then stored in the data area 600 (S725, S730, S735:No). Every time when the attribution data is stored in the data area 600, the CPU 492 increments the value K which indicates the number of bytes of the stored attribution data at S745. If the attribution data on the optical disk 6 is divided and stored in the subsequent blocks, although the 2048 bytes of data 600 is stored in the data area 600 (S740:Y), the end code is not detected (S735:N). In such a case, the subsequent block, which is indicated by the block number NH, and includes the subsequent attribution data is stored in the unit block area as overlapped (S720). Thus, for example, 50 bytes of the data area 600 are used for storing the attribution data and then the end code is read from the unit block area 520 and stored in the data storing area 600 of the RAM 500.

When all the attribution data for the first pattern, i.e., PATTERN 1 stored in the unit block area 520 is transmitted to the unit block area 520 and then the end code is read (S735:Y), data storing routine for storing display data is executed (S80 of FIG. 3).

Then, the CPU 492 stores the current data address indicated by the counter DA (8050=8000+50) to the address indicated by the counter HA (i.e., the address:6500) of the display table area 580 (S810). With this operation, the display data of the "PATTERN 1" becomes searchable based on the data stored in the display table area 580. Further, the CPU 492 updates the counter HA by a predetermined amount as is done for the counter ZA (S815:HA=6510).

At S820, the block data storing routine is executed. As described above, in this routine, if data is stored in the unit block area 520, and if all the data in the unit block area 520 has not yet processed, the routine does nothing. However, if the data stored in the unit block area 520 has been processed, or no data is stored in the unit block area 520, the CPU 492 reads data indicated by the block number NH from the optical disk 6, and stores the user data area of the block read from the optical disk 6, i.e., 2048 bytes of data, in the unit block area 520. Then, the CPU 492 reads one byte of the display data of the PATTERN 1 from the unit block area 520, and store the data into the data area 600 at address indicated by the counter DA (i.e., 8050) so that the display data is stored at the address indicated in the display data table and stored position coincide with each other. Further, the CPU 492 updates the counter DA in order that the subsequent address where the subsequent display data is to be stored. As described above, the CPU 492 stores the display data in the data area 600 until the end code is read from the optical disk 6 and stored in the data area 600 (S820 through S845).

If, for example, one address corresponds to one byte of data, and a hundred bytes of the data area 600 is used for storing the display data (S835:Y), the CPU 492 stores the current value of the counter DA (i.e., 8150) at the address indicated by the counter UA (in the stitching table area 590) at S910. Then, similar to the counter ZA and HA, the counter UA is updated (S915;UA=7010).

At S920, the block data storing routine is called. In this routine, as is done in the attribution storing routine, and the display data storing routine, if data is currently stored in the unit block area 520, and the data in the unit block area 520 has not yet processed completely, the routine does nothing. However, if the data stored in the unit block area 520 has been processed, or no data is stored in the unit block area 520, the CPU 492 reads data corresponding to the block number NH from the optical disk 6, and stores the user data area of the block read from the optical disk 6, i.e., 2048 bytes of data, in the unit block area 520.

Then, one byte of the stitching data is read from the unit block area 520 and stored at the address indicated by the counter DA (i.e., 8150) in the data area 600. Accordingly, the stitching table starts at the address indicated by the counter DA which has the same value of the address indicated by the counter UA and stored in the stitching table area 590 (S925). As one byte of the stitching data is stored, the counter DA is updated, i.e., incremented by one (S930), and another one byte of the stitching data is read from the unit block area 520 and then stored in the data area 600 until the end code is read and stored.

If the number of patterns does not reach the maximum number Nmax of the patterns stored in the optical disk (S100:N; S120), data storing operation for the subsequent patterns, i.e., PATTERNs 2, 3, . . . is executed similar to the operation for the PATTERN 1 (S50 through S90). As to PATTERN 2, for example, the starting addresses (6010, 6510 and 7010) of the attribution data, the display data, and the stitching data area are stored at address 5510 in the attribution table area 560, at address 6010 of the display table area 580 and at address 6510 of the stitching table area 580, respectively. The attribute data of the PATTERN 2 is stored at address following the stitching data of the PATTERN 1, i.e., arranged to be located from address 8650 of the data area 600.

Storing operation of the sewing data is finished as the number of the patterns reaches the maximum number Nmax (S100;Y). Then, the CPU 492 controls the input/output switching device 496 and 498 such that the read/write device 1 operates in a mode where data can be transmitted to the sewing machine M (S130).

At S140, in response to a calling signal from the sewing machine M, the CPU 492 transmits the sewing data via the connector 2. In the embodiment, the CPU 492 recognizes the portion after address 5000 of the RAM 500 of the data converting device as if it is the memory card C.

In the memory card C, the card information is stored from address 0, while in the RAM 500, the card information is stored from address 5000. Accordingly, in the above-described embodiment, when the card information is read, it is set that the address 5000 is read. Alternatively, an additional RAM may be provided in the data converting device, and the virtual card area 610 of the RAM 500 may be formed at an area starting from address 0 of the additional RAM. If the addressing starts from 0, no particular operation may be done when the card information is read.

Figure 7:
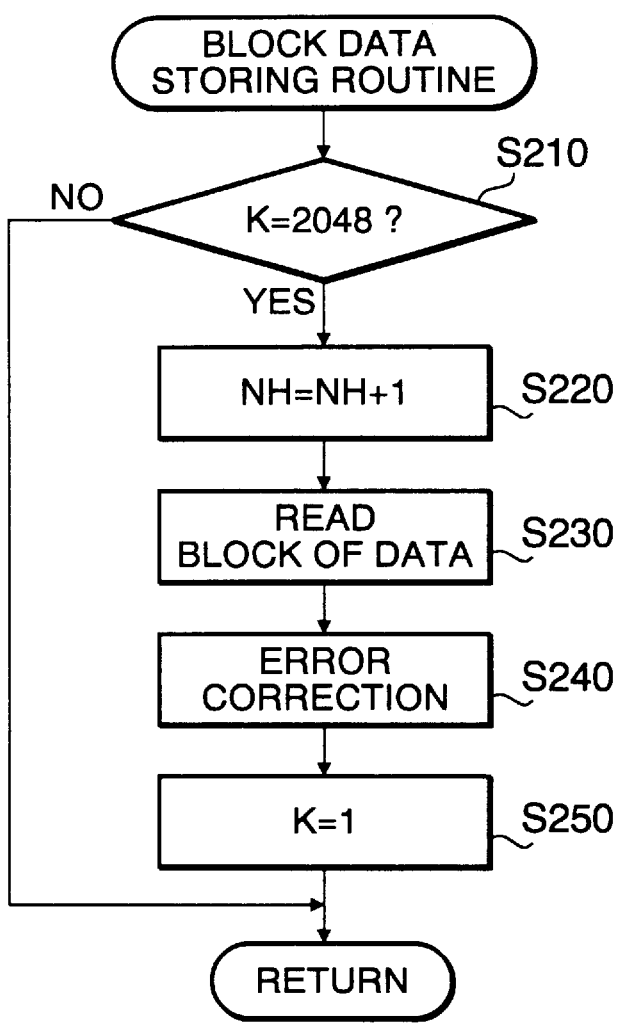
FIG. 7 is a flowchart illustrating block data storing routine.

Data transmission from the optical disk 6 to the unit block area 520 of the data converting device 1 will be described with reference to FIG. 7 showing a flowchart of the block data storing routine.

At step S210, whether one block of sewing data is to be transmitted to the unit block area 520 is determined. If one block of the sewing data is to be transmitted to the unit block area 520 (S210:YES), the output block number NH is incremented by one (S220), and the block indicated by the output block number NH is read from the optical disk (S230). When the data is read out of the optical disk 6 at S230, only the data stored in the user data area (2048 bytes) of the block that is indicated by the block number NH is read, and then the data is stored in the unit block area 52. At this stage, the CPU 492 checks whether data transmission error has occurred based on the read data and the ECC data, and if the error has occurred, the CPU 492 corrects the data based on the ECC data, or re-read the block from the optical disk 6.

Since a new block of data replaces the data stored in the unit block area 520, the counter K is reset (i.e., set to one) for the succeeding process, which is described above.

Note that the synchronizing data, ID data area used for synchronization or for indication of the mode to be used for operating the optical disk 6, and area not stored in the RAM 500.

Further, if it is determined at S210 that K is not equal to 2048, it means that the block of the sewing data is not to be transmitted at the time when the block data storing routine is called. In such a case, steps S22 to S250 are skipped, i.e., no substantial process is executed in the block data storing routine.

With use of the above-described data converting device 1, since the data stored in the optical disk 6 is converted into data having a format similar to the memory card, i.e., the addressing format, and with use of a connector 2, the converted data can be transmitted from the data converting device 1 to the sewing machine M. Even if a sewing machine which is designed to read a particular memory card, with use of the data converting device according to the embodiment, the data stored in the optical disk can be used in such a sewing machine. In other words, even a conventional sewing machine can used the optical disk as the external data storing medium, and used the data stored therein.

Since the data converting device 1 is provided outside the sewing machine, a sewing mechanism which causes shaking when sewing is performed may be arranged to be apart from each other so that the shaking caused by the sewing mechanism does not affect. Since the data converting device 1 operates without shaking, data reading operation thereof is not prevented. Further, since the optical disk is capable of storing a large amount of data in comparison with the semiconductor memory such as a RAM, ROM, data representing a large, and high density embroidery pattern can be stored. Furthermore, a large number of data can be stored, the number of the recording medium can be lessened, space for holding the recording medium can also be reduced, and the number of the recording medium.

In the above-described embodiment, the sewing machine M and the data converting device 1 are capable of reading and writing data from and to the external recording medium, i.e, the optical disk 6. However, the invention is not limited to the described embodiment, but can be applied to devices which are capable of only reading or writing. Further, in the embodiment, the optical disk 6 is used as an example of the external recording medium, and other medium such as MO (Magneto-Optical disk), MD (Magnetic Disk), PD ( ) and the like can also be used. If the data is not necessarily be written in the medium, a CD-ROM can also be used as a recording medium.

Furthermore, in the embodiment, the optical disk 6 is to be inserted every time it is used. However, if a device such as a hard disk drive but employing the optical disk is used, it is possible to omit the insertion operation of the disk.

Since the optical disk 6 contains a large amount of data, if an MPU (microprocessor unit) is employed instead of the CPU 492, data processing can be done quickly.

Furthermore, in the embodiment, the data converting device executes the data conversion. Alternatively, it may be possible to make the sewing machine to perform such a function.

In the embodiment, connection between the data converting device 1 and the electronically controlled sewing machine M is described. However, the data converting device 1 is connectable with an embroidery data creating device or the like as disclosed in Japan Patent Provisional Publication HEI 6-86881. If the data converting device is made connectable to well-known disk drives via generally-used interface such as SCSI, the applicability of the data converting device will be enhanced.

Still further, in the embodiment, the data converting device 1 develops the data having the same amount as the memory card C would have in the RAM 500 at the same time. However, it may be possible to control the device 1 to read a part of the data from the optical disk 6 and store in the RAM 500. Further, the RAM of the sewing machine which stores the sewing data transmitted from the data converting device may have a capacity for storing all the sewing data for a certain embroidery pattern.

If the RAM of the sewing machine is to receive only a part of data from the data converting device 1 at a time, regardless of the large amount of the data stored in the optical disk 6, the sewing machine can form the embroidery or the like in accordance with the data stored in the optical disk 6.

In the above-described embodiment, the attribution data, the display data and the stitching data are transmitted from the optical disk to the sewing machine via the data converting device 1. Depending on the sewing machine, these data are not always necessary. That is, if the sewing machine M or the data converting device 1 is of a type which controls the stitching needle N and the embroidery frame W based on the display data, displays the image of the embroidery pattern, and determines the attribution based on the display data, the other data is not necessarily transmitted from the optical disk 6. It is also possible to create data based on one data. For example, based on the stitching data or the display data, the other data can be created. The process of creating the other data may be performed by the sewing machine M or the data converting device.

In the above-described embodiment, a device which reads out data form the optical disk 6 and a device which converts the read data and transmits the converted sewing data to the sewing machine M are constructed integrally as one device. The invention does not limit such a construction, and the two devices, i.e., an optical disk reader and a data converter may be separately provided and used to achieve substantially the similar effect as is done in the above-described embodiment.

Figure 11:
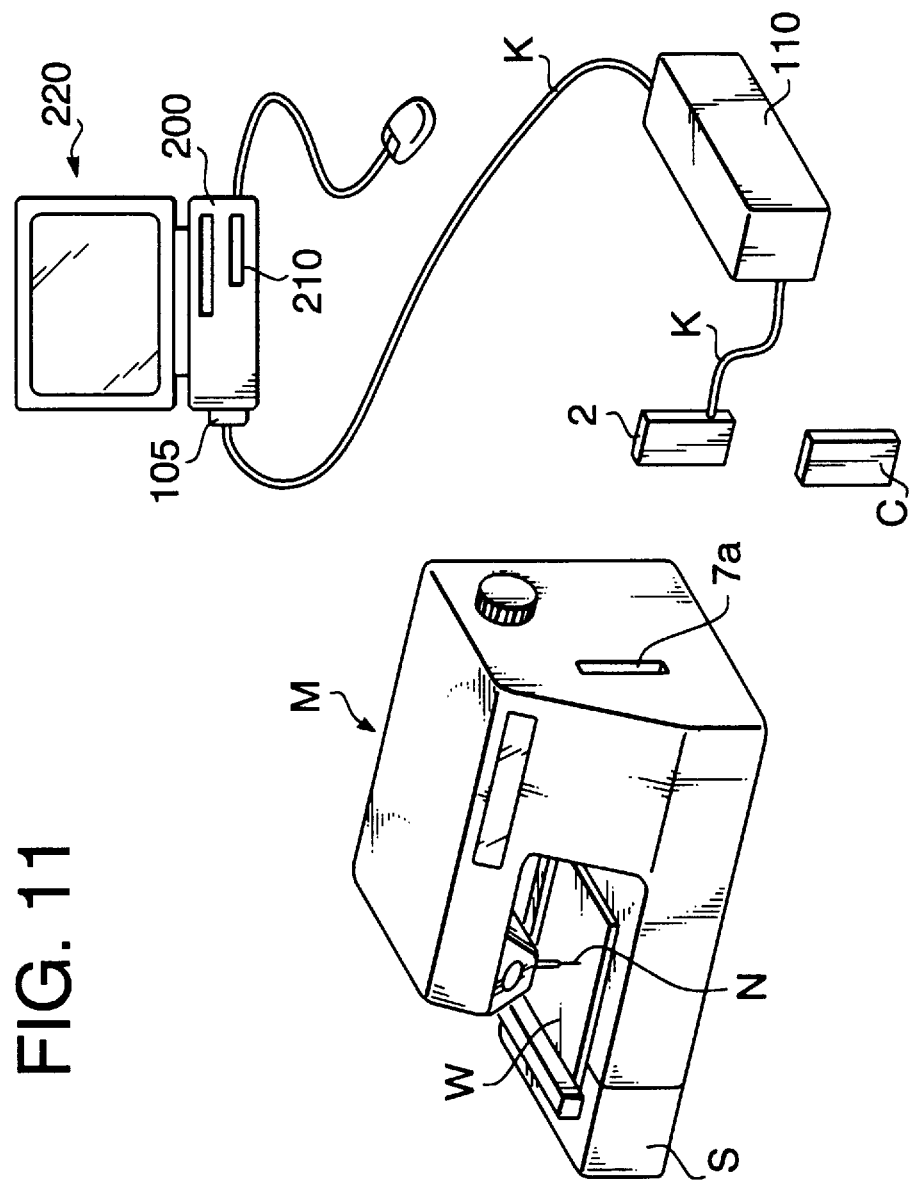
FIG. 11 is a modified example of the sewing machine and the data read/write device.
Figure 12:
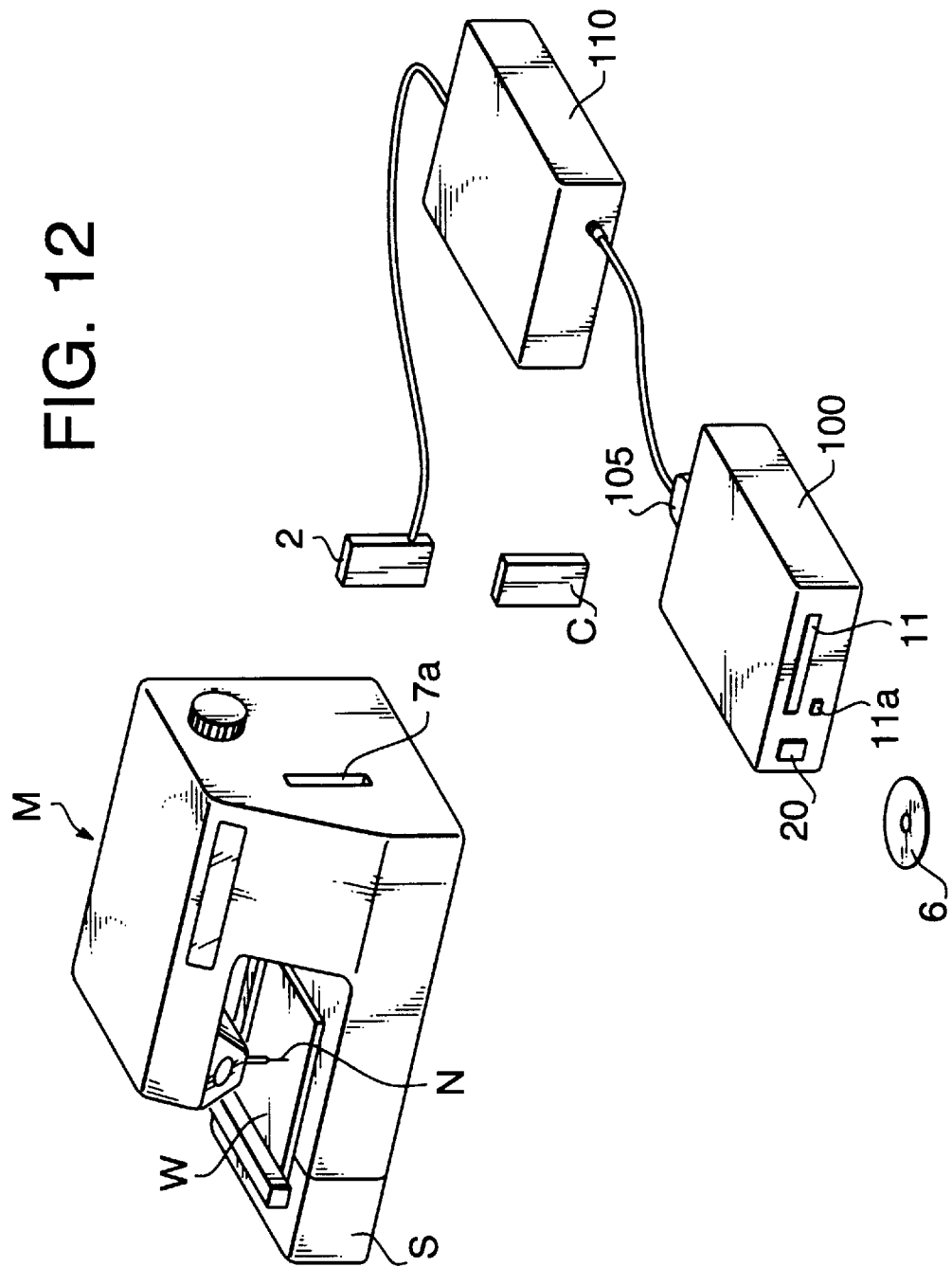
FIG. 12 is further modified example of the sewing machine and the data read/write device.
Figure 13:
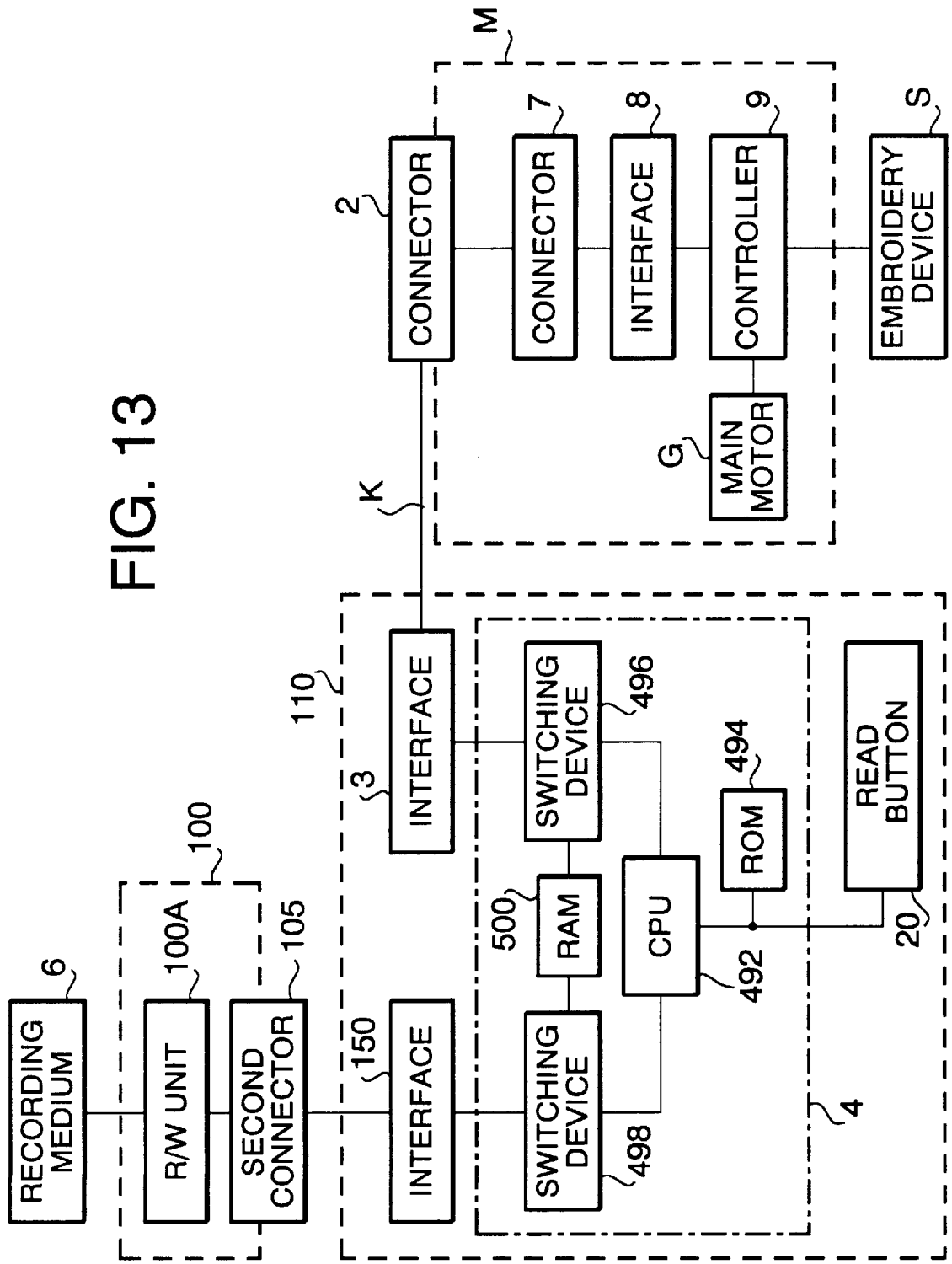
FIG. 13 is a block diagram of the modified example of FIG. 12.
Figure 14:
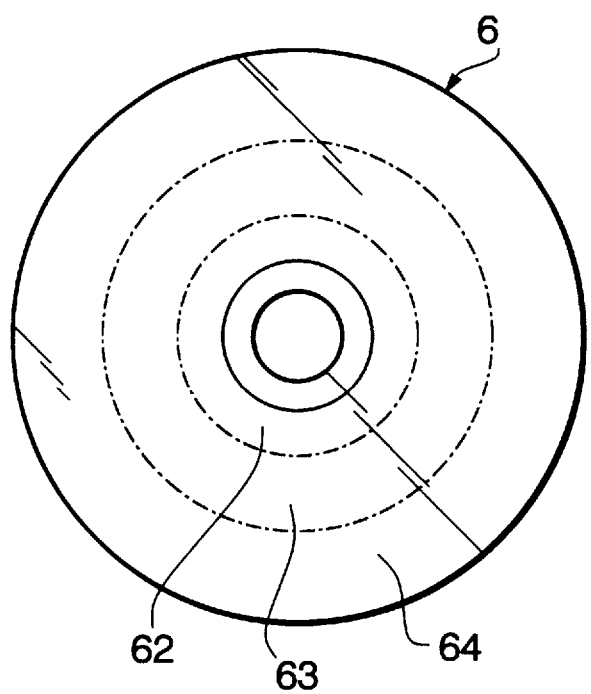
FIG. 14 shows a data areas of the optical disk.

For example, as shown in FIGS. 11, 12 and 13, as the optical disk reader, a well-known computer 220 having an optical disk drive 200 and a floppy disk drive 210 (see FIG. 11), or a stand-alone disk reader 100 provided with a read/write unit 100A (see FIG. 12) can be used. As the data convertor, one which has a connector 2 and a second connector 105 which is connectable to the computer 220 or disk reader 100 may be used. According to such a system provided with separate devices, i.e., the computer 220 or the disk reader 100, and the data converter 110 provided with the connector 2 and another connector 105 as above, data transmission between the floppy disk or the optical disk and the sewing machine can be achieved similar to the above-described embodiment. Further, if the computer 220 or the disk reader 100 is capable of reading a recording medium other than the optical disk, data transmission between such a recording medium and the sewing machine can also become possible, and the flexibility of the system configuration can be achieved.

In the above-described embodiment, the order of the data, i.e., the attribution data, the display data, and the stitching data in the optical disk 6 and in the memory card C are the same, and only the recording format is converted from the tracking format to the addressing format. If the order of the recorded data in the optical disk 6 is different from the order in the memory card C, by adding a process for changing the order in the conversion steps, such a data can also be dealt with. That is, by changing the step of the order, it is possible to store the data in the RAM 500 with the same format as used in the memory card C.

In the above-described embodiment, only one RAM 500 is used for temporarily storing all of the search table area 510, the counter area 520, the unit block area 530 and the virtual card area 610. It is possible to use separate areas for storing the virtual card area 610 and the other areas.

Further, in the embodiment, the card information stored in the card information area 540 corresponds to only one memory card C. However, depending on the contents in the optical disk 6, it is possible to store card information corresponding to various card formats in the card information area 540. Alternatively, the card information can be stored in the ROM 494. Further, the card information stored in the ROM 494 may also correspond to a plurality of different formats of memory cards to be used by various sewing machines.

In the above-described embodiment, the data converting device 1 transmits the converted data only to one sewing machine. It is possible to construct the data converting device 1 to transmits the data to a plurality of sewing machines. In this case, the data can be sent to the plurality of sewing machines simultaneously, or can be sent selectively. Further, it is also possible to make the data converting device 1 to receive the data from one or a plurality of sewing machines.

Further, in the above-described embodiment, data stored in the optical disk is read and stored in the RAM, data structure being converted so that the structure is the same as that of the card memory. Since, the data structures of both the card memory and the optical disk are given, it also is easy to read the data stored in the RAM on to the optical disk. Therefore, if a data is created in the sewing machine, the data can be stored in the RAM having the same data structure as the card memory. Thereafter, the data stored in the RAM can be transferred onto the optical disk.

The present disclosure relates to subject matter contained in Japanese Patent Applications No. HEI 7-287106, filed on Nov. 6, 1995, and No. HEI 8-133263, filed on May 28, 1996, which are expressly incorporated herein by reference in their entireties.

What is claimed is:

1. An embroidery data converting device for an embroidery data processing apparatus using a first external recording medium which stores embroidery data in accordance with a predetermined data format, said embroidery data processing apparatus having a receptacle to which said first external recording medium is to be electrically connected, said embroidery data converting device comprising:

a data transmitting unit which transmits embroidery data between said data converting device and a second recording medium which stores said embroidery data in accordance with a second data format which is different from said predetermined data format;

a memory;

a data storing controller which receives said embroidery data from said second recording medium and stores at least a part of said embroidery data in said memory in accordance with said predetermined data format; and a connector which can be electrically connected to said receptacle, said embroidery data stored in said memory being transmitted to said embroidery data processing apparatus.

2. The embroidery data converting device according to claim 1, wherein said memory stores embroidery data received through said connector from said embroidery data processing apparatus in accordance with said predetermined data format, and wherein said data transmitting unit sends embroidery data stored in said memory to said second recording medium in accordance with said second data format.

3. The embroidery data converting device according to claim 1, wherein said memory includes a first memory and a second memory, wherein said first memory stores a predetermined amount of embroidery data received from said second recording medium at a time in accordance with said second data format, wherein said second memory stores embroidery data in accordance with said predetermined data format, and wherein said data storing controller reads said embroidery data stored in said first memory and stores said read embroidery data in said second memory with changing the order of said read embroidery data.

4. An embroidery data converting device for an embroidery data processing apparatus using a first external recording medium which stores data in accordance with a first data format, said embroidery data processing apparatus having a receptacle to which said first external recording medium is to be electrically connected, said embroidery data converting device comprising:

a data receiving unit which receives embroidery data from a second recording medium which stores said embroidery data in accordance with a second data format which is different from said first data format;

a first memory which temporarily stores said embroidery data received by said data receiving unit in accordance with said second data format;

a second memory;

a data storing controller which reads said embroidery data stored in said first memory and stores said embroidery data in said second memory such that said embroidery data is stored in said second memory in accordance with said first data format; and a connector which can be electrically connected to said receptacle, said embroidery data stored in said second memory being transmitted to said embroidery data processing apparatus.

5. The embroidery data converting device according to claim 4, wherein said first data format is one of an addressing format and a tracking format, and said second data format is the other of said addressing format and said tracking format.

6. The embroidery data embroidery converting device according to claim 5, wherein said first external recording medium comprises a semiconductor memory which is formatted in accordance with said addressing format.

7. The embroidery data converting device according to claim 6, wherein said first external recording medium comprises a memory card.

8. The embroidery data converting device according to claim 5, wherein said second recording medium is an optical disk employing said tracking format.

9. The embroidery data converting device according to claim 4, wherein said embroidery data processing apparatus comprises a device built in a sewing machine, and wherein said sewing machine is capable of stitching in accordance with the embroidery data stored in said second memory.

10. The embroidery data converting device according to claim 4, wherein said embroidery data processing device is a device provided in a sewing machine, and wherein said sewing machine is capable of stitching in accordance with said embroidery data stored in said second memory.

11. A sewing system comprising:
   a sewing machine, said sewing machine having a receptacle to which a first external recording medium is connectable, said first external recording medium storing in accordance with a first data format embroidery data which is read by said sewing machine through said receptacle and used for forming an embroidery;
   a data reading device which is capable of reading embroidery data stored in a second recording medium in accordance with a second data format which is different from said first data format; and
   a data converting device having a memory, said data converting device receiving embroidery data from said data reading device and storing at least a part of said received embroidery data in accordance with said first data format in said memory, said data converting device being provided with a connector which is connectable to said receptacle, said embroidery data stored in said memory in accordance with said first data format being readable by said sewing machine through said connector coupled to said receptacle.

12. An embroidery data converting system for an embroidery data processing apparatus, said embroidery data processing apparatus having a receptacle to which a first external recording medium is connectable, said first external recording medium storing embroidery data in accordance with a first data format, said embroidery data converting system comprising:
   a second recording medium which stores embroidery data in accordance with a second data format which is different from said first data format;
   a data reading system which reads embroidery data from said second recording medium;
   a data receiving system which receives said embroidery data read by said data reading system from said second recording medium;
   a data storing system which stores said embroidery data received by said data receiving system in accordance with said first data format; and
   a connecting system which electrically connects said data storing system with said receptacle.

13. The embroidery data converting system according to claim 12, which includes a data converting device in which said data reading system, said data receiving system, said data storing system and said connecting system are integrally provided.

14. The data embroidery converting system according to claim 12, which includes a data reading device and a data converting device separate from said data reading device, said data reading device being provided with said data reading system, said data converting device being provided with said data receiving system, said data storing system, and said connecting system.

15. The embroidery data converting system according to claim 14, wherein said data reading device comprises a computer having a disk reading device.

* * * * *